United States Patent [19]
Nakamura

[11] Patent Number: 4,843,523
[45] Date of Patent: Jun. 27, 1989

[54] HEADLIGHT DEVICE

[75] Inventor: Yasuhiro Nakamura, Shimizu, Japan

[73] Assignee: Koito Seisakusho Co. Ltd., Tokyo, Japan

[21] Appl. No.: 206,447

[22] Filed: Jun. 14, 1988

[30] Foreign Application Priority Data

Mar. 31, 1988 [JP] Japan .............................. 63-43151[U]

[51] Int. Cl.$^4$ ............................................. B60Q 1/10
[52] U.S. Cl. ..................................... 362/69; 362/273; 362/275; 362/283; 362/284; 362/422; 362/423
[58] Field of Search ....................... 362/61, 66, 69, 80, 362/269, 270, 273, 275, 283, 284, 285, 287, 289, 422, 423, 424

[56] References Cited

U.S. PATENT DOCUMENTS

| 1,711,129 | 4/1929 | Sklarek ................................. 362/423 |
| 4,419,721 | 12/1983 | Gregoire et al. .................... 362/368 |
| 4,674,018 | 6/1987 | Ryder et al. ......................... 362/424 |
| 4,689,725 | 8/1987 | Saijo et al. .......................... 362/66 |
| 4,703,399 | 10/1987 | Van Duyn et al. ................... 362/66 |

Primary Examiner—Stephen F. Husar
Attorney, Agent, or Firm—Sughrue, Mion, Zinn, Macpeak, and Seas

[57] ABSTRACT

A headlight device including a movable member connected to a stationary supporting member at spaced apart three points, at two of said three points said movable member being connected respectively to the stationary supporting member through aiming mechanisms which enable to change the space between the supporting member and the movable member respectively. At least one of the aiming mechanism comprises an adjusting rod and a gear unit, and the gear unit includes a casing mounted on the supporting member, a worm gear, a worm wheel meshing with the worm gear, a pinion gear co-axial with the worm gear, a driving gear meshing with the pinion gear, with the axis of the driving gear being arranged orthogonal to the axis of the worm wheel, and an actuating rod connected to the driving gear and extending through the casing. The adjusting rod has one end being rotatably connected to the movable member and screw-threads being formed in the intermediate portion for engaging with the threaded bore in the worm wheel of the gear unit.

8 Claims, 11 Drawing Sheets

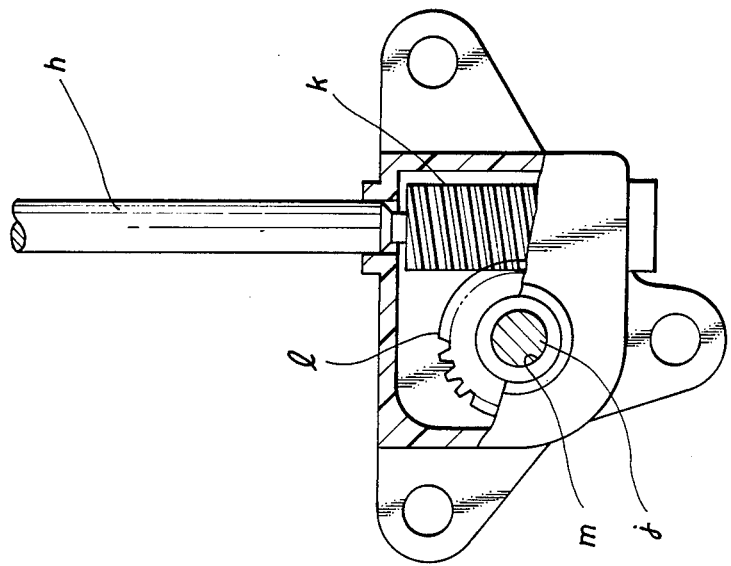
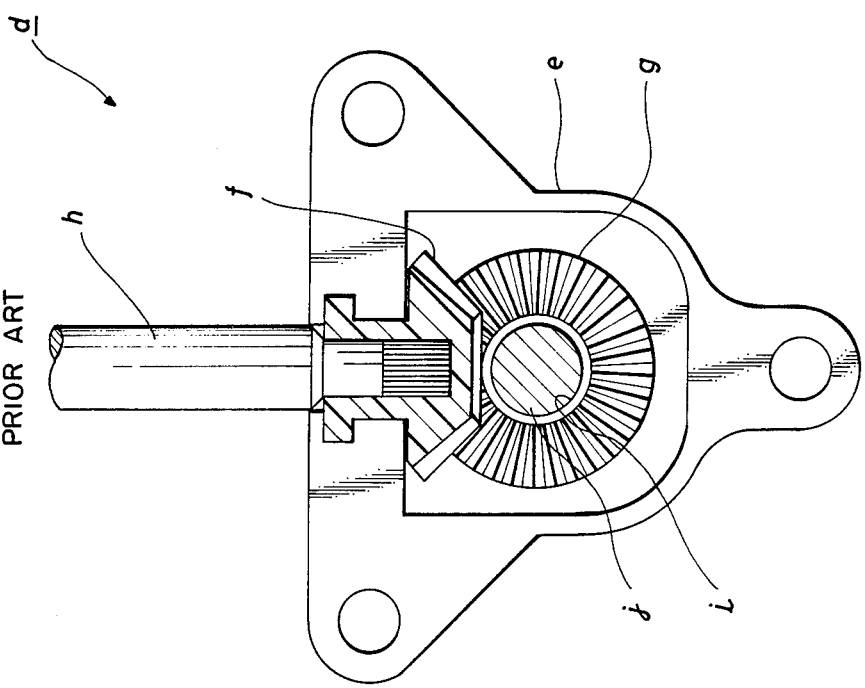

HEADLIGHT DEVICE

FIELD OF THE INVENTION

The present invention relates to a headlight device for use in a vehicle such as an automobile and the like which enables to change the direction of the light beam.

DESCRIPTION OF PRIOR ART

One prior art headlight device which enables to change the direction of the light beam comprises, as shown in FIGS. 10 and 11, a headlight unit a supported tiltably on a vehicle body b through two aiming mechanisms c (only one of which is shown in the drawings). The aiming mechanism c comprises a gear unit d received in a casing e which is secured on the vehicle body b, and two intermeshing bevel gears f and g received rotatably in the casing e. An actuating or input rod h is connected to the bevel gear f, and extends upwards from the casing e. The bevel gear g is on the output side and has a screw-threaded bore i therein. An adjusting rod j engages screw-threadingly with the bore i and the tip end thereof is connected to the headlight unit a through a ball joint.

In the headlight device, when the actuating rod h is rotated with the adjusting rod j being prevented from the rotation thereof, the adjusting rod j moves forward or rearward, whereby the space between the vehicle body b and a portion of the headlight unit a to which the tip end of the adjusting rod j is connected changes, and the headlight unit a moves inclininingly around a line connecting remaining two points through which the headlight unit a is connected to the vehicle body b.

In the headlight device aforementioned, there is a problem that a levelling mechanism cannot be provided.

The levelling mechanism is a mechanism for changing the direction of the light beam in response to the load on the vehicle. In the headlight device of FIG. 11, when the adjusting rod j is rotated with the bevel gear g of the output side being fixed, the adjusting rod j moves forward or rearward and the headlight unit a inclines correspondingly. However, the load acting on the bevel gear g is simply of the meshing engagement between the bevel gear f, thus, when the adjusting rod j is rotated the bevel gears g and f rotate, and the rod j does not move longitudinally. Therefore, it is not possible to connect a levelling mechanism with the headlight unit a.

One countermeasure is shown in FIG. 12, wherein the bevel gears f and g in FIG. 10 are substituted by a worm gear k and a worm wheel l with the worm gear k being on the input side and the worm wheel l having a screw-threaded bore m receiving therethrough the adjusting rod j. The load acting on the worm wheel l in transmitting the rotation from the worm wheel l to the worm gear k is sufficiently large, thus, it is possible to rotate the adjusting rod j by the levelling mechanism to move the adjusting rod j in the forward or rearward direction corresponding to the rotation of the adjusting rod j. However, the input shaft or the axis of the worm gear k does not intersect with the output shaft or the axis of the worm wheel l, thus, it is difficult to suitably locate the actuating rod h on the vehicle body.

SUMMARY OF THE INVENTION

An object of the present invention is to overcome the shortcomings in the prior art devices and, according to the invention, there is provided a headlight device of the type including a movable member connected to a stationary supporting member at spaced apart three points. Two of the three points are respectively connected through aiming mechanisms which enable to change the space between the supporting member and the movable member respectively. Each of the aiming mechanism comprises an adjusting rod and a gear unit. The gear unit comprises a casing mounted on the supporting member, a worm gear, a worm wheel meshing with the worm gear, a pinion gear co-axial with the worm gear, a driving gear meshing with the pinion gear, with the axis of the driving gear being arranged orthogonal to the axis of the worm wheel, and an actuating rod secured to the driving gear and projecting out of the casing. The adjusting rod has one end being rotatably connected to the movable member and screw-threads being formed in the intermediate portion to engage with a threaded bore in the worm wheel of the gear unit.

Therefore, according to the invention, the axis of the input shaft or the actuating rod acting as a member for changing the direction of the light beam of the headlight unit and the axis of the output rod or the adjusting rod are arranged in the orthogonal relationship, it is possible to determine the location of a bore in the vehicle body for receiving the actuating rod therethrough on the basis of the location of the adjusting rod and, thus, the operation is very easy and the aiming mechanism can easily and accurately be installed.

BRIEF DESCRIPTION OF THE DRAWINGS

Further objects and advantages of the invention will become apparent from the following detailed description in conjunction with accompanying drawings, in which:

FIG. 1 is a front view;

FIG. 2 is a section view taken along line II—II in FIG. 1;

FIG. 3 is a section view taken along line III—III in FIG. 1;

FIG. 4 is a section view taken along line IV—IV in FIG. 1;

FIG. 5 is an exploded perspective view of a gear unit;

FIG. 6 is a partially broken enlarged front view of the gear unit of FIG. 5;

FIG. 10 through FIG. 11 show a prior art headlight device, in which: FIG. 10 is a partial sectional view;

FIG. 11 is an enlarged sectional view of a gear unit taken generally along line XI—XI in FIG. 10, and FIG. 12 is a partially broken rear view of prior art gear unit modified from FIG. 11.

DETAILED DESCRIPTION OF PREFERRED EMBODIMENTS

Figure 1:
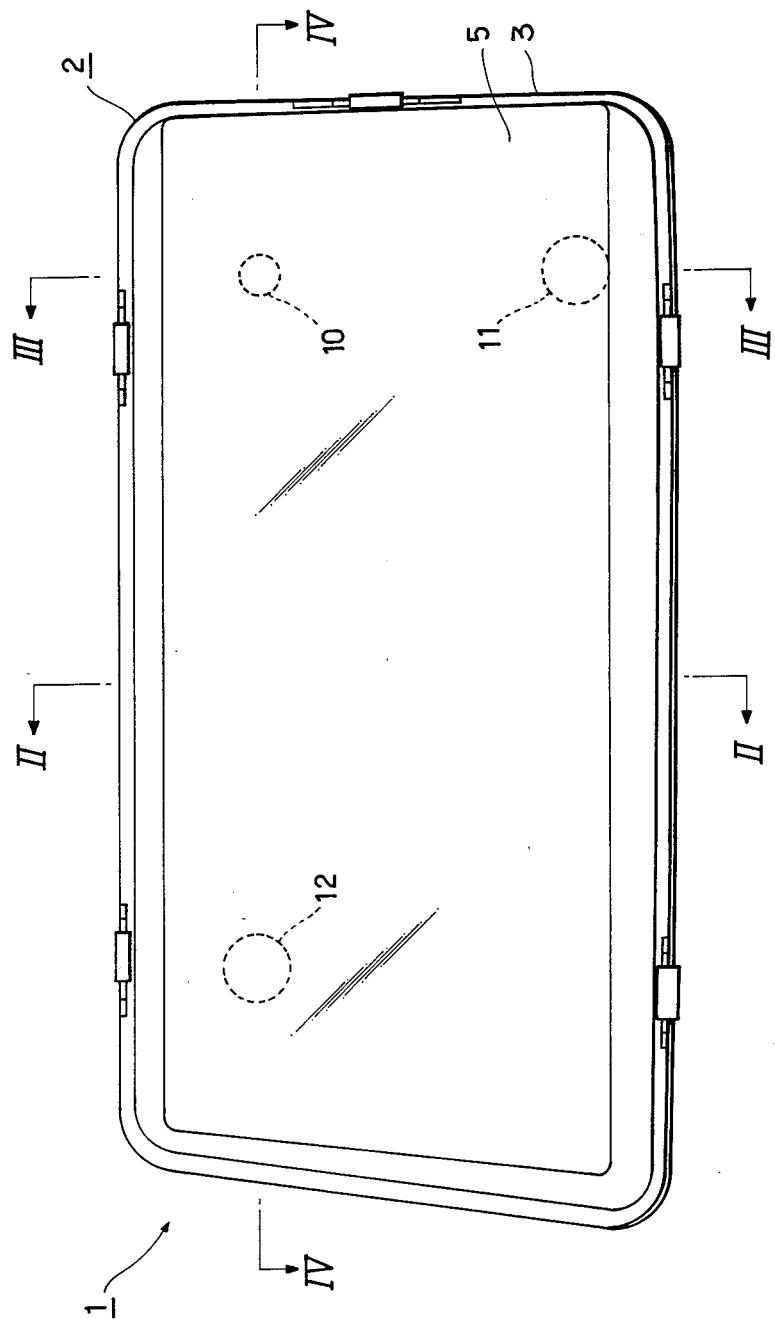
FIG. 1 through FIG. 6 show a headlight device according to a first embodiment of the present invention.
Figure 2:
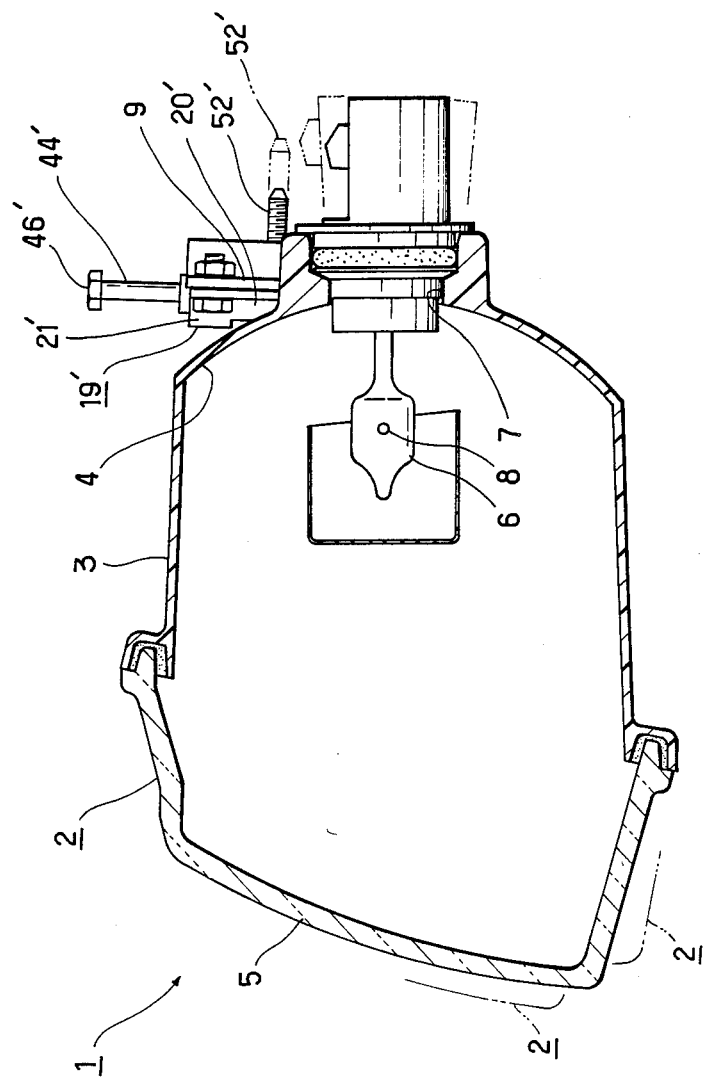

FIG. 1 through FIG. 6 show a headlight device according to a first embodiment of the invention, wherein the headlight device 1 is of the type of so-called unit movable automobile headlight, which comprises a headlight unit consisting of a lamp body having a lamp therein and a lens covering an opening of the lamp body, with the headlight unit being tiltable with respect to the body of a vehicle as a unit in changing the direction of the light beam of the headlight device.

As shown in FIGS. 1-4, the headlight unit 2 comprises the lamp body 3 formed of a synthetic resin. The lamp body 3 has a forward facing recessed surface 4 which is reflective by vapor depositing a metal or by coating a reflective paint. A lens 5 is mounted on the forward edge of the lamp body 3. An electric lamp or bulb 6 is supported on a bulb mounting opening 7 formed in the rear end of the lamp body 3, and a light emitting portion 8 of the bulb 6 is located in a lamp space which is defined between the lens 5 and the reflective surface 4. The headlight unit 2 is connected to a vehicle body 9 through three points 10, 11 and 12. A rotary supporting mechanism 13 is located at point 10, and at points 11 and 12, the headlight unit 2 is connected to the vehicle body 9 through aiming mechanisms respectively.

Figure 3:
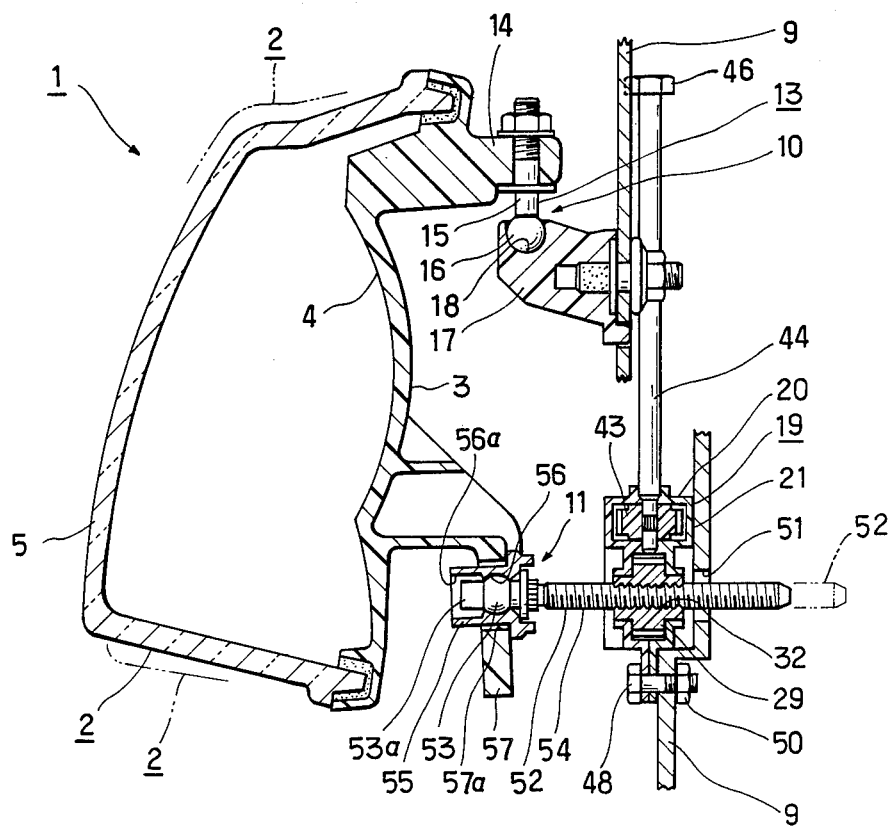
Figure 4:
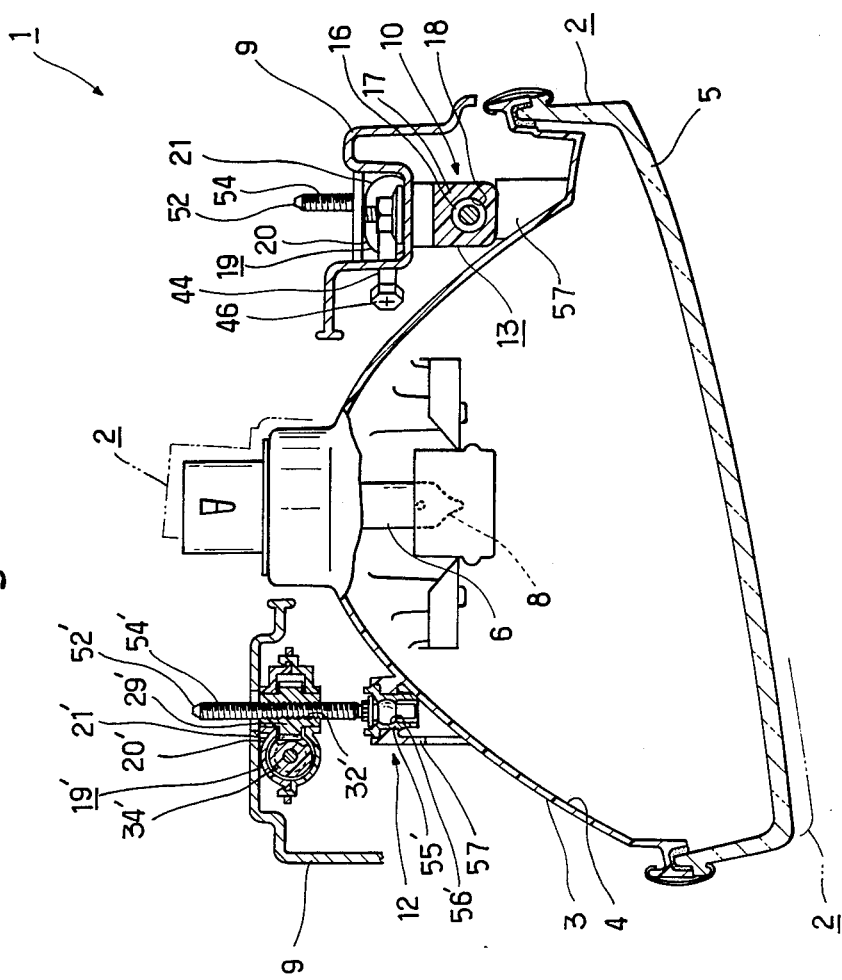

The point 10 is located adjacent to the upper right corner of the headlight unit 2, as shown in FIG. 1, as viewed from the front. The rotary supporting mechanism 13 comprises, as shown in FIGS. 3 and 4, a supporting portion 14, integrally formed on the lamp body 3 to project rearward, a rod member 15 secured on the supporting portion 14 and formed of a metal, a spherical portion 16 formed on the lower end of the rod member 15 integrally, and a socket member 17 formed of a synthetic resin material and secured on the vehicle body 9 to project in the forward direction. The spherical portion 16 is received in the socket member 17 and can rotate within a predetermined range.

Figure 5:
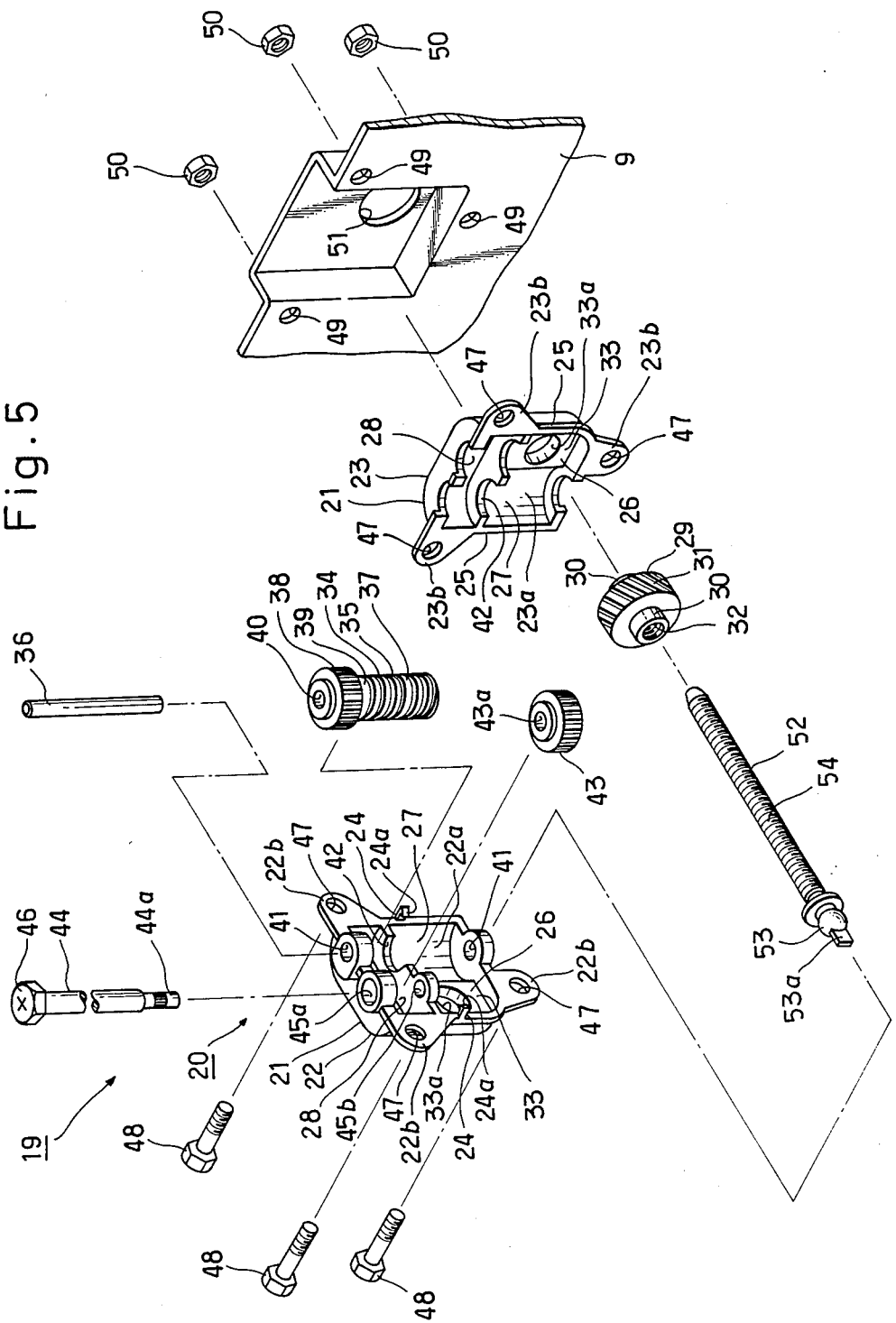
Figure 6:
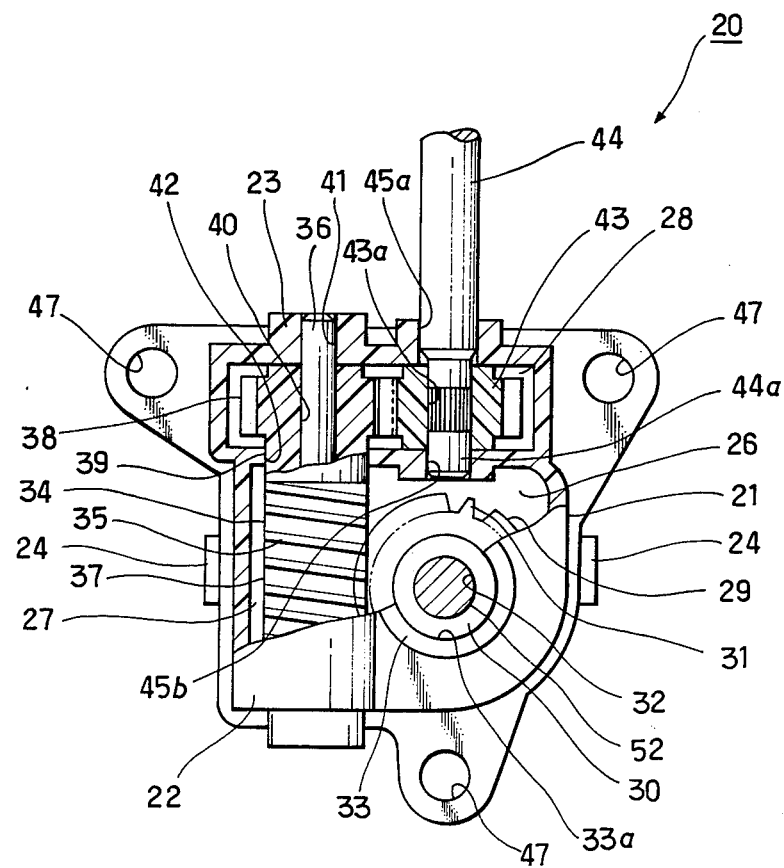
Figure 7:
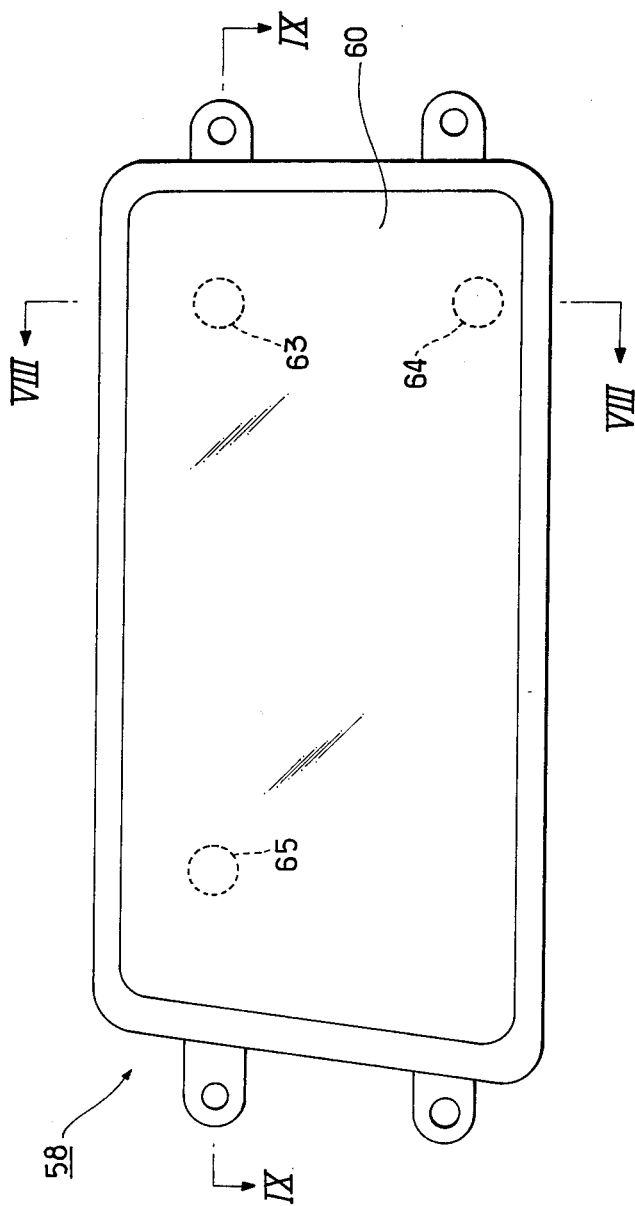
FIG. 7 is a schematic front view of a headlight device according to a second embodiment of the invention.
Figure 8:
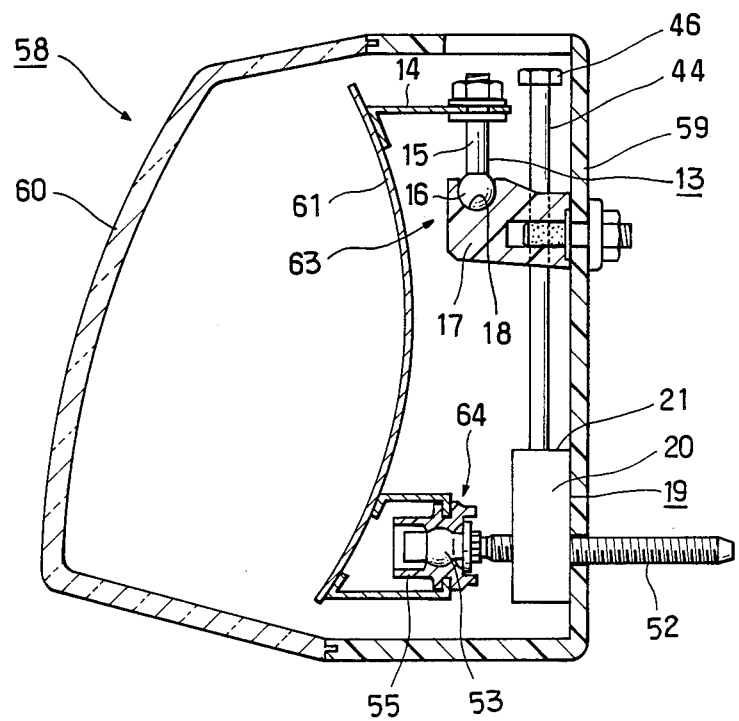
FIG. 8 is a section view taken along line VIII—VIII in FIG. 7.
Figure 9:
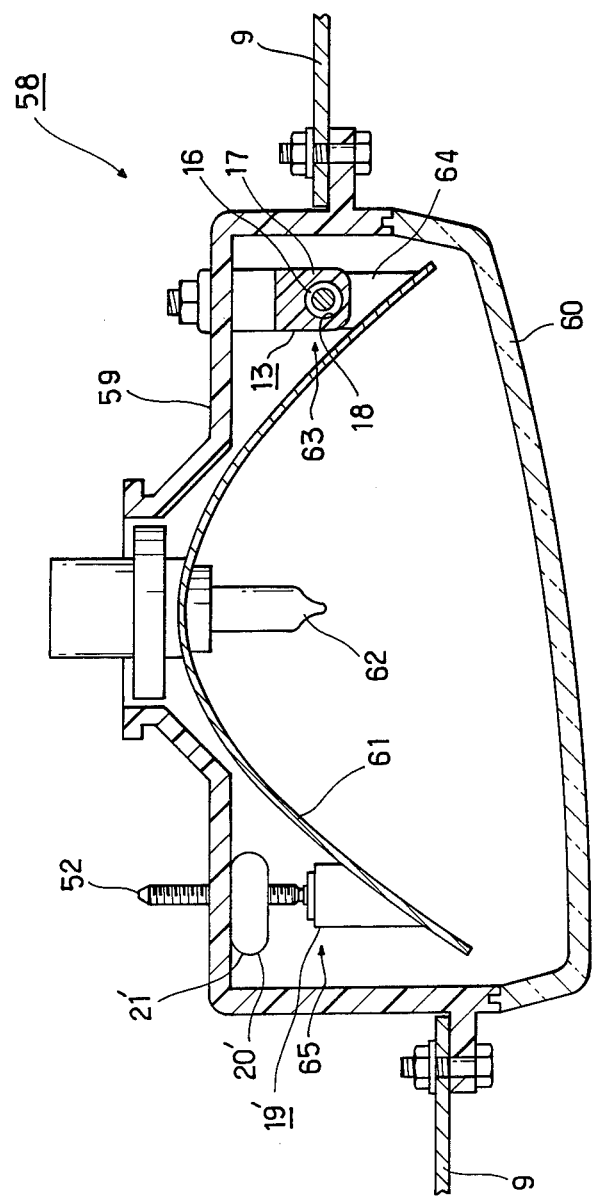
FIG. 9 is a section view taken along line IX—IX in FIG. 7.
Figure 10:
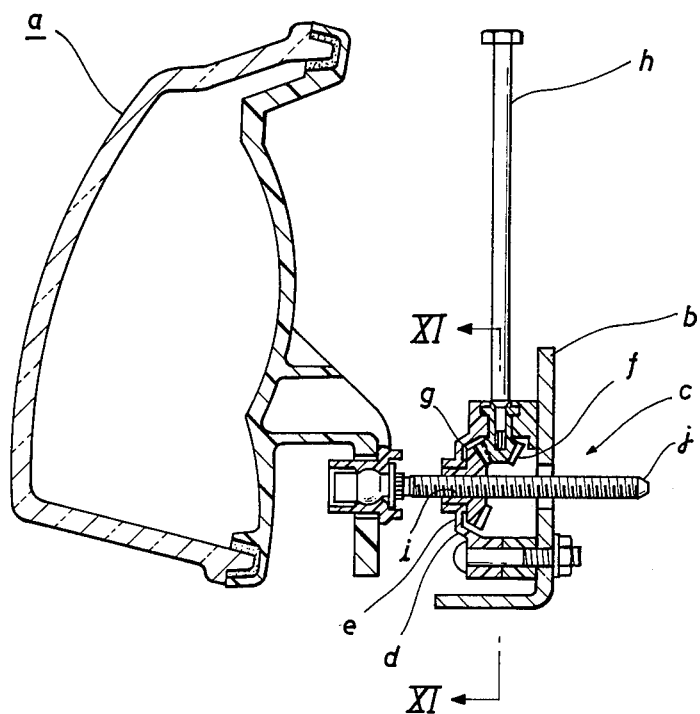

The headlight unit 2 is connected to the vehicle body 9 through aiming mechanisms 19 and 19' at point 11 which is spaced from the point 10 in the downward direction as viewed in FIG. 1 and at point 12 which is spaced from the point 10 in the leftward direction as viewed in FIG. 1 respectively. The aiming mechanism 19 and 19' are substantially the same and, thus, the aiming mechanism 19 will now be explained in detail and the description of the other aiming mechanism 19' is omitted, with the parts corresponding to the aiming mechanism 19 being depicted by the same reference numerals with the prime being attached thereto. (FIG. 5)

The aiming mechanism 19 comprises a gear unit 20. The gear unit 20 includes a casing 21 consisting of mutually connected two casing bodies 22 and 23, which integrally have receiving portions 22a and 23a, and mounting pieces 22b, 22b and 22b and 23b, 23b and 23b respectively. The casing body 22 has engaging arms 24 and 24 which project integrally from side portions of the receiving portion 22a of the casing body 22 toward the other casing body 23, and engaging pawls 24a and 24a are formed on the tip end portions of the engaging arms 24 and 24 engage with side edge portions 25 and 25 of the receiving portion 23a of the other casing body 23, whereby the casing bodies 22 and 23 are connected to constitute the casing 21.

A receiving space is formed by connecting two receiving portions 22a and 23a and consisting of a worm wheel receiving portion 26, a worm gear receiving portion 27 and a pinion gear receiving portion 28.

A worm wheel 29 is rotatably received in the worm wheel receiving portion 26, and comprises a boss portion 30 located in the central portion, a gear portion 31 radially projecting from the longitudinal central portion of the boss portion 30, and screw-thread bore 32 extending through the boss portion 30.

Thick thickness portions 33 and 33 are respectively formed in generally central portions of receiving portions 22a and 23a of the casing bodies 22 and 23, and have supporting bores 33a and 33a respectively, which receive respectively therein front and rear end portions of the boss portion 30 of the worm wheel 29, whereby the worm wheel 29 is rotatably received in the worm wheel receiving portion 26 in the casing 21.

A worm gear 34 consists of a gear portion 35 and a shaft portion 36. The gear portion has integrally a worm portion 37, an intermediate portion 39 and a pinion portion 38 co-axially, and a bore 40 extending through the central portion. The shaft portion 36 is forcively fitted in the bore 40, and the opposite end portions of the shaft portion 36 project slightly from the upper and lower end surfaces of the gear portion 35.

Supporting bores 41 and 41 are formed respectively in the upper and lower end portions of the worm gear receiving portion 27, and receive rotatably the upper and lower end portions of the shaft portion 36 of the worm gear 34. The worm portion 37 of the worm gear 34 meshingly engage with the gear portion 31 of the worm wheel 29.

A circular supporting bore 42 is formed near to the upper end of the worm gear receiving portion 27 and supports rotatably the intermediate portion 39 of the worm gear 34.

A pinion gear 43 acting as a driving member has a bore 43a for forcively receiving lower end portion 44a of an actuating rod 44. The lower end of the actuating rod 44 projects slightly from the lower surface of the pinion gear 43.

Supporting bores 45a and 45b are formed respectively in the upper and lower walls of the pinion gear receiving portion 28, with the bore 45b receiving rotatably therein the lower end of the lower end portion 44a of the actuating rod 44 and the bore 45a receiving rotatably a portion just above the lower end portion 44a of the actuating rod 44.

Thus, the pinion gear 43 is received rotatably in the pinion gear receiving portion 28 of the casing 21 and meshingly engages with the pinion portion 38 of the worm gear 34. The actuating rod 44 extends in the upward direction, and has a head portion 46 on the upper end.

The gear unit 20 is fixedly mounted on the vehicle body 9 through mounting bolts 48, 48 ... which extend respectively through mounting holes 47, 47 ... formed in mounting pieces 22b ... and 23b ... of the casing 21 and through mounting holes 49, 49 ... formed in the vehicle body 9, and are secured by nuts 50, 50 ....

A through hole 51 is formed in the vehicle body 9 and is co-axial with the supporting holes 33a and 33a in the casing 21 of the gear unit 20.

It will be understood that the wording vehicle body 9 includes not only the vehicle body itself but any member secured to the vehicle body such as a member supporting or encircling the headlight unit or the like.

An adjusting rod 52 has a spherical body 53 on the front end portion and a shaft portion 54 extending rearward from the spherical body 53 and having screw-threads thereon. The shaft portion 54 threadingly engages with the threaded bore 32 of the worm wheel 29 of the gear unit 20. A projection 53a is formed on the spherical body 53 as shown in FIG. 5.

As clearly shown in FIG. 3, a bracket 57 is integrally formed on the rear surface of the lamp body 3 and has an opening 57a for supporting a receptacle member 55 which has a spherical recess 56 opening in the rear direction and having a longitudinally extending groove 56a. The spherical body 53 of the adjusting rod 52 is fitted in the spherical recess 56 in the receptacle member 55 to constitute a ball joint connecting the forward end of the adjusting rod 52 with the lamp body 3 of the headlight unit 2. The projection 53a on the adjusting rod 52 is received in the groove 56a in the receptacle member 55 thereby preventing the rotation of the adjusting rod 52.

Operation of the aiming mechanism will now be stated. In changing the direction of the light beam or inclining the headlight unit, the actuating rod 44 or 44′ of the gear unit 20 or 20′ of the aiming mechanism 19 or 19′ is rotated.

In changing the direction of the light beam in the vertical direction, the actuating rod 44 of the aiming mechanism 19 is rotated. The rotation of the rod 44 is transmitted through the pinion gear 43 and the worm gear 34 to the worm wheel 29. Since the rotation of the adjusting rod 52 is prevented, the rotation of the worm wheel 29 acts to move forward or rearward the adjusting rod 52 by the engagement between the threaded bore 32 of the worm wheel 29 and the threaded shaft portion 54 of the adjusting rod 52. The space between headlight unit 2 and the vehicle body 9 at the location of the aiming mechanism 19 changes, thereby the headlight unit 2 inclines around a line connecting the point 10 supported by the rotary supporting mechanism 13 and the point 12 supported by the aiming mechanism 19′ or a horizontal line in FIG. 1.

In changing the direction of the light beam in the point 65 near to the left end and horizontally aligning with the point 63. At the point 63 the mirror 61 is connected to the lamp body 59 through the rotary supporting mechanism 13, and at points 64 and 65 the mirror 61 are connected respectively to the lamp body 59 through aiming mechanisms 19 and 19′.

In the rotary supporting mechanism 13, the receiving member 17 is secured to the lamp body 59 and the shaft member 15 is secured to the reflective mirror 61.

In the aiming mechanisms 19 and 19′ the gear units 20 and 20′ are secured to the lamp body 59 and the receptacle members 55 and 55′ are secured to the mirror 61 respectively.

The direction of the light beam can be changed by rotating the actuating rods 44 and/or 44′ of the aiming mechanisms 19 and/or 19′ suitably thereby tilting the reflective mirror 61 as desired.

As described in detail, the headlight device according to the invention is of the type including a movable member connected to a stationary supporting member at spaced apart three points, at two of the three points the movable member being connected respectively through aiming mechanisms which enable to change the space between the supporting member and the movable member respectively; wherein each of the aiming mechanism comprises an adjusting rod and a gear unit. And the gear unit includes a casing on the supporting member, a worm gear, a worm wheel meshing with the worm gear, a pinion gear co-axial with the worm gear, a driving gear meshing with the pinion gear, with the axis of the driving gear being arranged orthogonal to the axis of the worm wheel, and an actuating rod secured to the driving gear and projecting out of the casing. The adjusting rod has one end being rotatably connected to the movable member and screw-threads being formed in 2. A headlight device according to claim 1, wherein said movable member is connected to the supporting member at one of said three points through a ball joint and at remaining two of said three points through said aiming mechanisms respectively.

3. A headlight device according to claim 2, wherein said remaining two of three points are located, as viewed from the front, relative to said one point vertical and horizontal respectively.

4. A headlight device according to claim 3, wherein the aiming mechanism connecting the movable member to the stationary member at said remaining two points are provided with means for preventing the rotation of said adjusting rod.

5. A headlight device according to claim 4, wherein said means for preventing the rotation of said adjusting rod includes a mechanism connecting the adjusting rod with a levelling mechanism.

6. A headlight device according to claim 4, wherein said means for preventing the rotation of said adjusting rod includes a projection formed on one end of the adjusting rod and an engaging recess formed in a member secured to the movable member and engaging with the projection so as to prevent the rotation of the adjusting rod.

7. A headlight device according to claim 1, wherein the movable member is a lamp body.

8. A headlight device according to claim 1, wherein the movable member is a reflective mirror.

* * * * *